United States Patent
Jeong

(10) Patent No.: US 7,903,364 B2
(45) Date of Patent: Mar. 8, 2011

(54) METHOD OF PROTECTING HARD DISK DRIVE FROM SHOCKS AND HARD DISK DRIVE THEREFOR

(75) Inventor: Woo-cheol Jeong, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 187 days.

(21) Appl. No.: 11/181,849

(22) Filed: Jul. 15, 2005

(65) Prior Publication Data

US 2006/0012912 A1    Jan. 19, 2006

(30) Foreign Application Priority Data

Jul. 16, 2004   (KR) ......................... 10-2004-0055465

(51) Int. Cl.
*G11B 21/02* (2006.01)
*G11B 5/596* (2006.01)
*G11B 27/36* (2006.01)

(52) U.S. Cl. ..................... 360/75; 360/77.08; 360/31
(58) Field of Classification Search .................. None
See application file for complete search history.

(56) References Cited

U.S. PATENT DOCUMENTS

| | | | | |
|---|---|---|---|---|
| 6,115,200 A * | 9/2000 | Allen et al. | ...................... | 360/60 |
| 6,226,140 B1 * | 5/2001 | Serrano et al. | .................. | 360/60 |
| 6,304,406 B1 * | 10/2001 | Douglas et al. | ............ | 360/73.03 |
| 6,429,990 B2 * | 8/2002 | Serrano et al. | .................. | 360/60 |
| 2002/0093753 A1 * | 7/2002 | Atsumi | ....................... | 360/73.03 |
| 2003/0218823 A1 * | 11/2003 | Dang et al. | .................. | 360/77.08 |
| 2004/0051993 A1 * | 3/2004 | Shin | ............................... | 360/75 |

FOREIGN PATENT DOCUMENTS

| | | |
|---|---|---|
| JP | 1993-101520 | 4/1993 |
| JP | 1994-302090 | 10/1994 |
| JP | 1994-309824 | 11/1994 |
| JP | 9-320175 | 12/1997 |
| JP | 1999-039785 | 2/1999 |
| JP | 2001-014783 | 1/2001 |
| JP | 2001-35101 | 2/2001 |
| JP | 2001-266466 | 9/2001 |
| JP | 2004-146036 | 5/2004 |
| KR | 1998-064265 | 10/1998 |

OTHER PUBLICATIONS

Japanese Office Action issued Nov. 9, 2010 in corresponding Japanese Patent Application 2005-206091.

* cited by examiner

*Primary Examiner* — Daniell L Negrón
(74) *Attorney, Agent, or Firm* — Staas & Halsey LLP

(57) ABSTRACT

Provided are a method of protecting a head and a disk in a HDD from shocks and an apparatus therefor by detecting the movement of the HDD using the amount of jitter in servo signals and unloading the head when the movement is great enough to damage the head and the disk. The method of protecting the HDD from shocks includes: reading the servo signals from the rotating disk using the head that follows tracks on the disk, detecting an amount of jitter in the servo signals, comparing the detected amount of jitter with a predetermined threshold amount of jitter corresponding to a movement great enough to damage the head and the disk, and unloading the head if the detected amount of jitter is greater than the predetermined threshold amount of jitter.

15 Claims, 8 Drawing Sheets

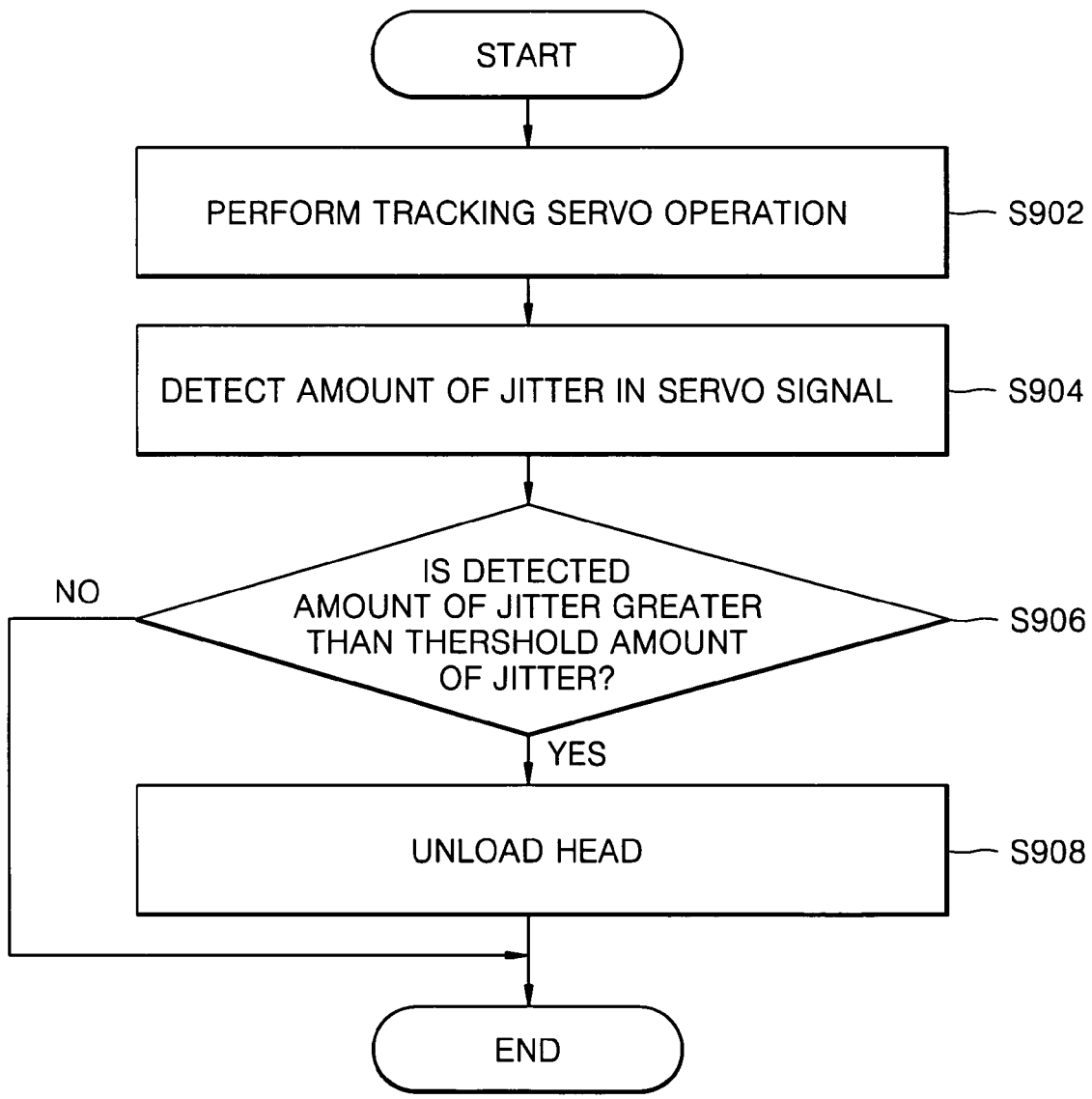

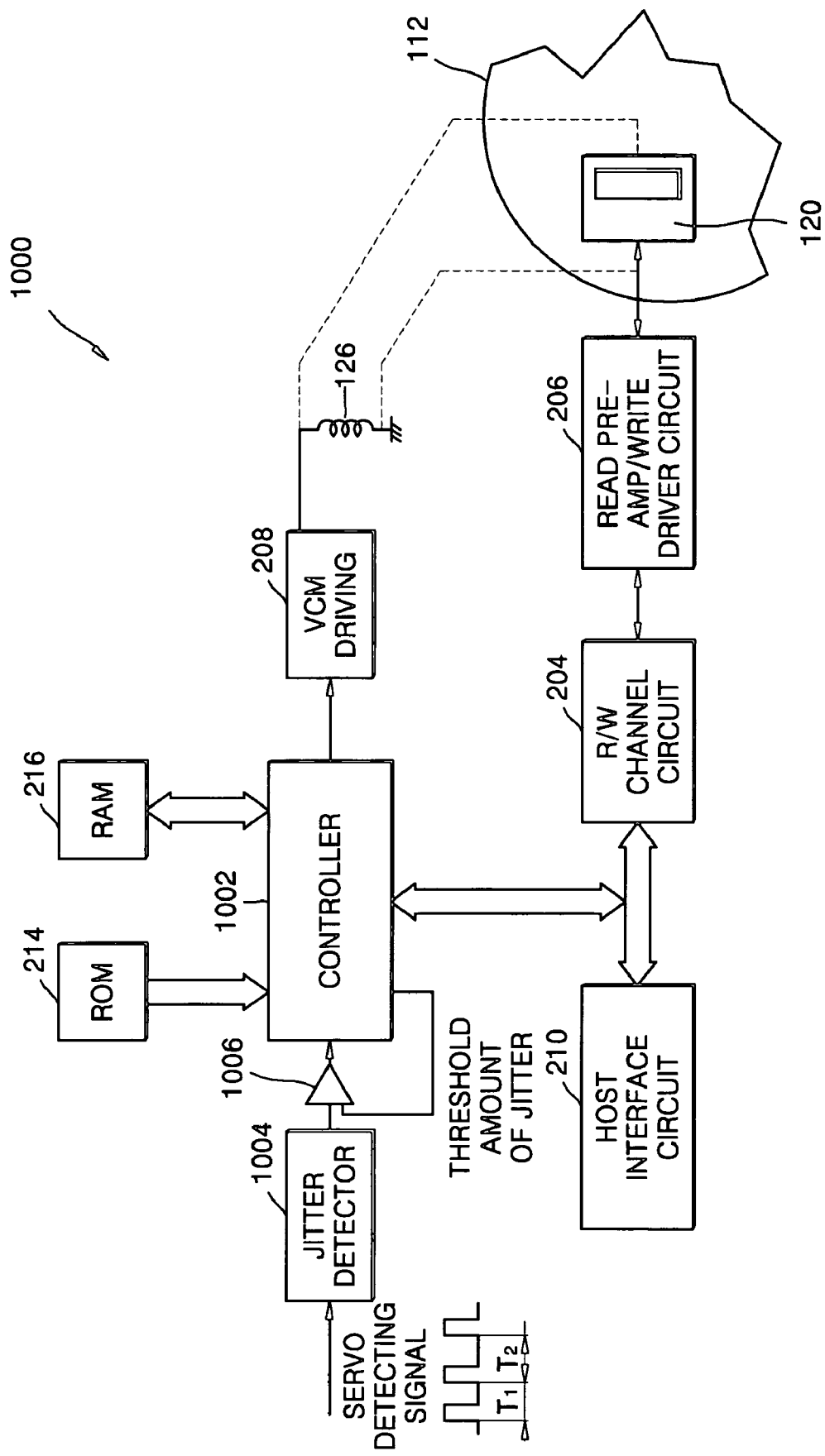

METHOD OF PROTECTING HARD DISK DRIVE FROM SHOCKS AND HARD DISK DRIVE THEREFOR

CROSS-REFERENCE TO RELATED APPLICATION

This application claims the priority of Korean Patent Application No. 2004-55465, filed on Jul. 16, 2004, in the Korean Intellectual Property Office, the disclosure of which is incorporated herein by reference.

BACKGROUND OF THE INVENTION

1. Field of the Invention

The present invention relates to a method of protecting a hard disk drive (HDD) from shocks, and more particularly, to a method of protecting a head and a disk in a HDD from shocks and an apparatus therefor by detecting the movement of the HDD using the amount of jitter in servo signals and unloading the head if the movement of the HDD is great enough to damage the head and the disk.

2. Description of Related Art

Hard disk drives (HDDs) are devices that read and write information on a disk. In general, information is recorded on concentric tracks on a surface of at least one magnetic recording disk. The disk is rotatably mounted on a spindle motor, and read/write means, that is, a read/write head, is mounted on an actuator arm that is rotated by a voice coil motor (VCM) accesses the information. The VCM is excited by current to rotate an actuator and move the read/write head. The read/write head senses variations of a magnetic field on the surface of the disk and reads the information recorded on the surface of the disk. Current is supplied to the read/write head so that the read/write head can write information on the data tracks. The current generates a magnetic field and the magnetic field magnetizes the surface of the disk.

HDDs are sensitive to external shocks and vibrations. External shocks or vibrations applied to HDDs may apply physical impacts to a head, resulting in a collision between the head and a disk. Therefore, such shocks and vibrations should be prevented.

As HDDs are persistently miniaturized, they can now be applied to many mobile systems, such as notebook computers, MP3 players, cellular phones, personal digital assistants (PDAs), and so on.

However, HDDs applied to mobile systems are generally subject to more and greater external shocks than those applied to fixed systems like desktop computers. Thus, HDDs should have sufficient shock resistance.

To solve the problem, methods have been suggested for sensing external shocks to compensate themselves or to stop some operations of disk drives until the external shocks are removed. Such methods mainly use a vibration accelerometer or a shock sensor mounted on the disk drives.

Apparatuses for sensing external shocks to perform counter-operations in HDDs are disclosed in Japanese Patent Laid-Open Publication Nos. 2001-266466 (published on Sep. 28, 2001), 1999-39785 (published on Feb. 12, 1999), 2001-014783 (published on Jan. 19, 2001), 1994-302090 (published on Oct. 28, 1994), 1993-101520 (published on Apr. 23, 1993), 1994-309824 (published on Nov. 4, 1994), for example.

However those apparatuses for protecting heads using shock sensors are available only when external shocks are directly applied to HDDs, that is, only when the shock sensors can detect the external shocks. HDDs used in mobile systems may be damaged not only by physical and direct shocks but also by violent movement or falling.

Accordingly, it may be more effective to predict external shocks great enough to damage a head and a disk before the shocks are actually applied and take measures to protect the head and the disk.

The shock resistance of HDDs is approximately 200 to 300 G when a head is loaded on a disk, while that of HDDs is 1000 G or more when the head is unloaded from the disk. Here, G is a unit to indicate one kilogram (1 Kg) with an acceleration of gravity (9.8 m/s2) being applied.

Accordingly, it is easily known that higher shock resistance could be obtained if the head is unloaded in predicting external shocks before those are actually applied.

FIG. 1 is a plan view of a conventional HDD.

A HDD 100 includes at least one disk 112 that is rotated by a spindle motor 114. The HDD 100 also includes a head 120 located adjacent to a surface of the disk 112.

The head 120 can read or record information from or on the disk 112 by sensing a magnetic field formed on the surface of the disk 112 or magnetizing the surface of the disk 112. Although one head is shown in FIG. 1, it should be appreciated that the head 120 consists of a write head for magnetizing the disk 112 and a read head for sensing the magnetic field of the disk 112.

An air bearing is generated between the head 120 and the surface of the disk 112. The head 120 is coupled to a head-stack assembly 122. The head-stack assembly 122 is attached to an actuator arm 124 having a voice coil 126. The voice coil 126 is located adjacent to a magnetic assembly 128 that supports a VCM 130. Current supplied to the voice coil 126 creates a torque that tends to rotate the actuator arm 124 relative to a bearing assembly 132. The rotation of the actuator arm 124 causes the head 120 to traverse the surface of the disk 112.

Information is stored in circular tracks of the disk 112. In general, the disk 112 includes a data zone on which user data is recorded, a parking zone on which the head 120 is parked when the HDD 100 is not used, and a maintenance cylinder. The kind of the head 120, correction values of recording parameters at high and low temperatures, and correction values of the recording parameters according to the kind of the head are stored in the maintenance cylinder.

FIG. 2 is a block diagram of a control system 200 for controlling the HDD 100 shown in FIG. 1.

Referring to FIGS. 1 and 2, the control system 200 includes a controller 202 coupled to the head 120 via a read/write (R/W) channel circuit 204 and a read pre-amp/write driver circuit 206. The controller 202 may be a digital signal processor (DSP), a microprocessor, or a microcontroller.

The controller 202 supplies a control signal to the R/W channel circuit 204 to read data from the disk 112 or record data on the disk 112.

Information is typically transmitted from the R/W channel circuit 204 to a host interface circuit 210. The host interface circuit 210 contains a control circuit for interfacing with a system, such as a personal computer (PC).

In a read mode, the R/W channel circuit 204 modulates an analog signal, which is read by the head 120 and amplified by the read pre-amp/write driver circuit 206, into a digital signal so as to be read by a host computer (not shown), and outputs the digital signal to the host interface circuit 210. In a write mode, the host interface circuit 210 receives user data from the host computer, converts the user data into current so as to be recorded on the disk 112, and outputs the current to the read pre-amp/write driver circuit 206 through signal processing.

The controller 202 is also coupled to a VCM driving circuit 208 that supplies driving current to the VCM 126. The controller 202 supplies a control signal to the VCM driving circuit 208 to control the excitement of the VCM 130 and the movement of the head 120.

The controller 202 is coupled to a read-only memory (ROM) 214 or a non-volatile random access memory (RAM) 216, such as a flash memory. The memories 214 and 216 contain commands and data used by the controller 202 to execute software routines.

The software routines include a seek routine that moves the head 120 to one track to another track, and a following routine that searches for a target sector in the track. The seek routine includes a servo control routine necessary for guaranteeing the head 120 to be moved to a correct track.

The controller 202 takes shock-absorbing measures according to the detection result of the shock sensor 212.

FIG. 3 is a diagram of the shock sensor 212 shown in FIG. 2.

As shown in FIG. 3, the shock sensor 212 includes a piezoelectric sensor 12 for sensing physical shocks and a converter for converting the result obtained by the piezoelectric sensor 12 into an electrical signal. The shock sensor 12 is attached in the HDD, particularly, to a printed circuit board (PCB) in the HDD.

However, since the conventional HDD as shown in FIG. 2 detects physical and direct external shocks using the shock sensor, it can be effectively used only when the shocks are actually applied to the HDD.

BRIEF SUMMARY

An aspect of the present invention provides a method of protecting a head and a disk from shocks by predicting external shocks before they are applied and unloading the head.

An aspect of the present invention also provides an apparatus for protecting a hard disk drive from shocks using the method.

According to an aspect of the present invention, there is provided a method of protecting a hard disk drive from shocks, including: reading servo signals from a rotating disk using a head that follows tracks on the disk; detecting an amount of jitter in the servo signals; comparing the detected amount of jitter with a predetermined threshold amount of jitter corresponding to a movement great enough to damage the head and the disk; and unloading the head when the detected amount of jitter is greater than the predetermined threshold amount of jitter.

According to another aspect of the present invention, there is provided a hard disk drive including: a head following tracks on a rotating disk and reading servo signals based on the rotating disk; a jitter detector comparing intervals at which servo signals read by the head with intervals at which normal servo signals are read, and detecting an amount of jitter in the servo signals based on the comparison; a comparator comparing the amount of jitter detected by the jitter detector with a predetermined threshold amount of jitter corresponding to a movement great enough to damage the head and the disk; and a controller controlling the head to be unloaded according to a comparison result of the comparator.

According to another aspect of the present invention, there is provided a method of improving a shock resistance of a hard disk drive, including: reading servo signals from a rotating disk; detecting an amount of jitter in the servo signal; comparing the detected amount of jitter with a predetermined threshold; and unloading the head if the detected amount of jitter is greater than the predetermined threshold.

According to another aspect of the present invention, there is provided method of protecting a hard disk drive without a shock sensor from shocks, including: reading servo signals from a rotating disk using a head that follows tracks on the disk; detecting an amount of jitter in the servo signals; comparing the detected amount of jitter with a predetermined threshold corresponding to a movement great enough to damage the head and the disk; and unloading the head when the detected amount of jitter is greater than the predetermined threshold.

According to another aspect of the present invention, there is provided a shock resisting section of a hard disk drive, including: a jitter detector comparing intervals at which servo signals read by a head following tracks of a disk with intervals at which normal servo signals are read, and detecting an amount of jitter in the servo signals based on the comparison; a comparator comparing the amount of detected jitter with a predetermined threshold; and a controller unloaded a loaded head according to a comparison result of the comparator.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which:

FIG. 9 is a flowchart of a method of protecting a head from shocks according to an embodiment of the present invention; and FIG. 10 is a block diagram of a HDD according to an embodiment of the present invention.

DETAILED DESCRIPTION OF EMBODIMENT

Figure 1:
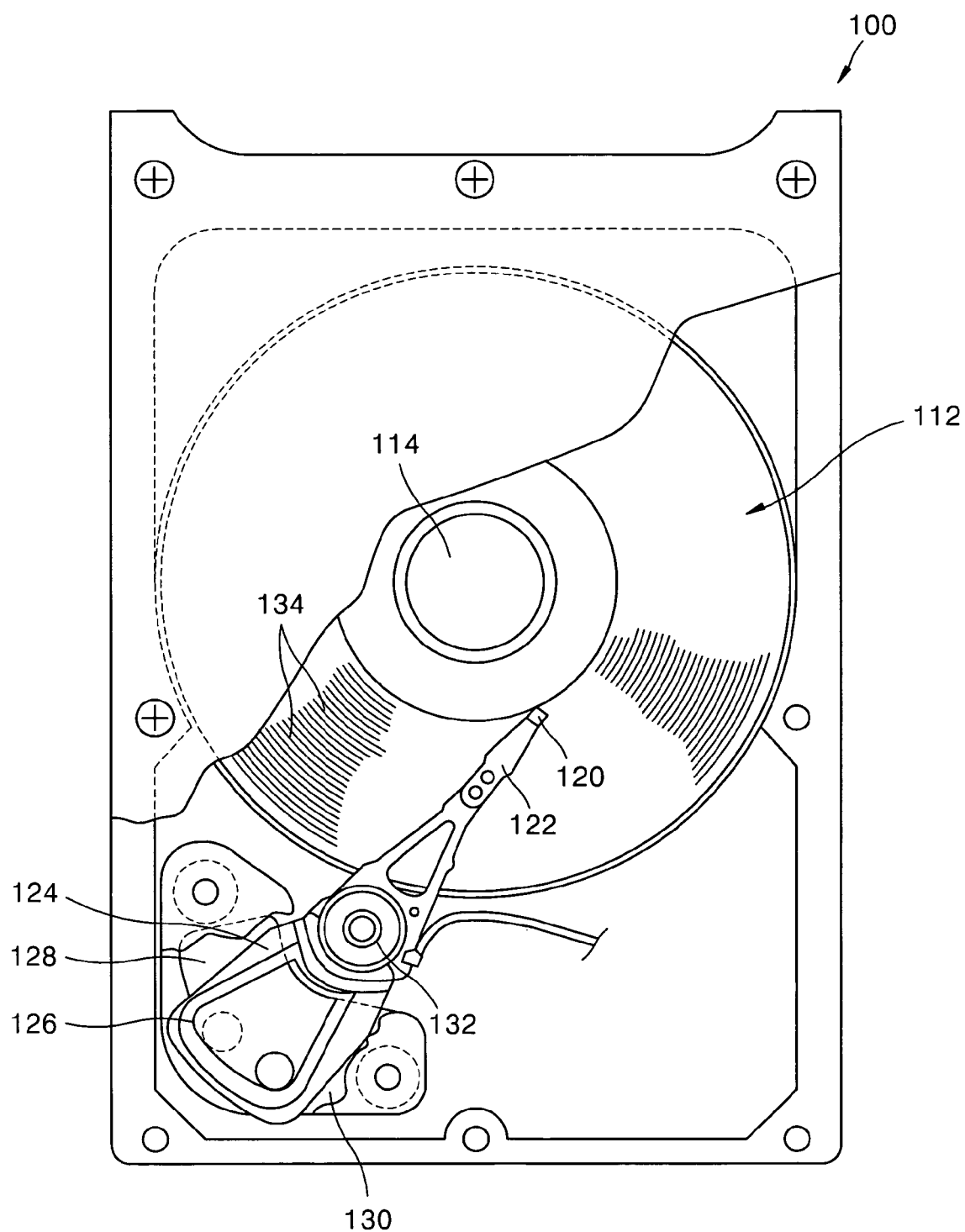
FIG. 1 is a plan view of a conventional hard disk drive (HDD)

Reference will now be made in detail to an embodiment of the present invention, examples of which are illustrated in the accompanying drawings, wherein like reference numerals refer to the like elements throughout. The embodiment is described below in order to explain the present invention by referring to the figures.

Figure 4:
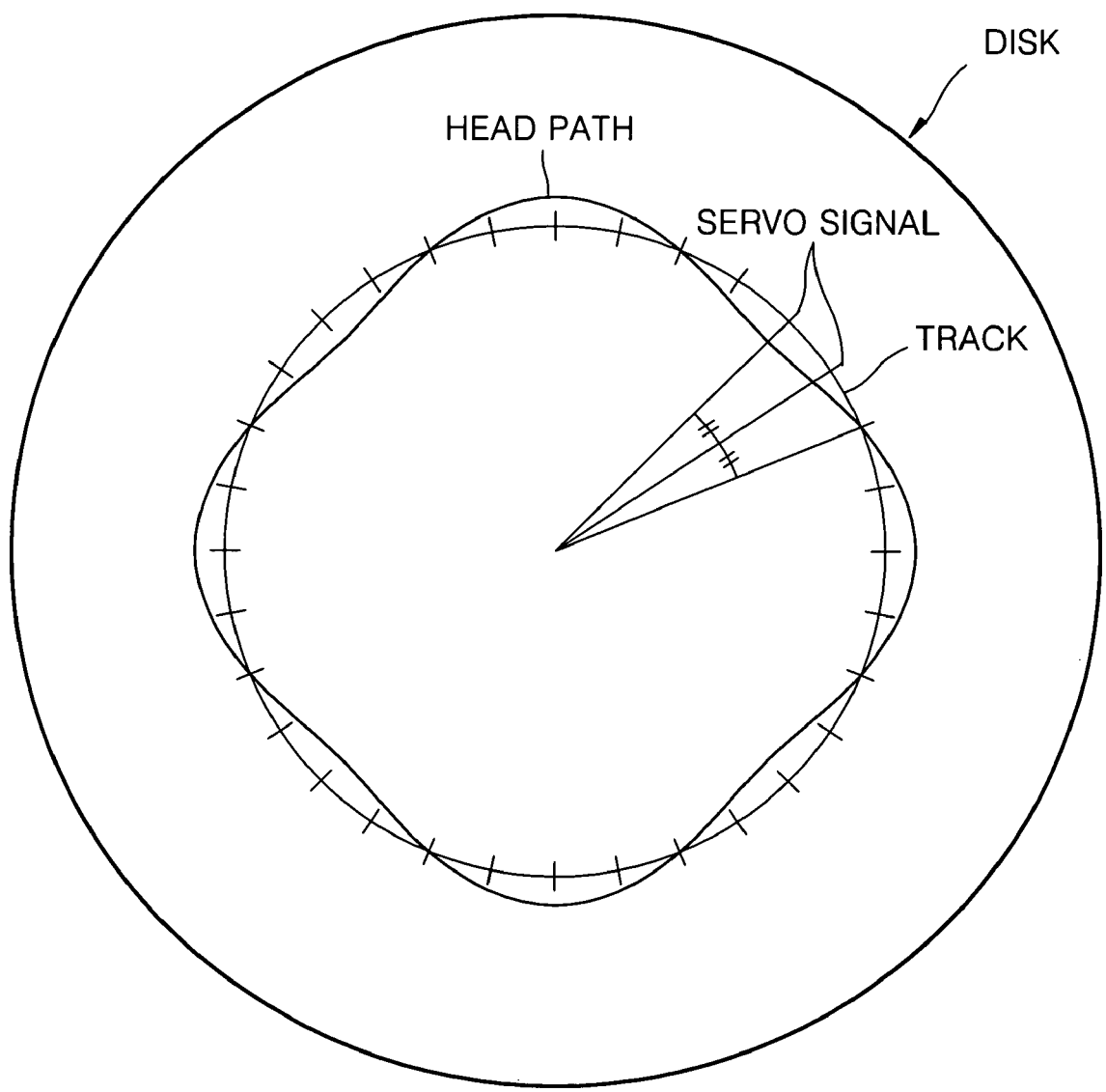
FIG. 4 is a diagram illustrating relations among a disk, tracks, and servo signals in a HDD.

FIG. 4 is a diagram illustrating relations among a disk, tracks, and servo signals in a hard disk drive (HDD). Lots of concentric tracks are formed on the disk, and each track contains a plurality of sectors and servo signals. The servo signals are located at regular intervals, and each servo signal is disposed between adjacent sectors. A head follows the tracks to read sector data and the servo signals. A position error signal for enabling the head to follow the tracks is obtained from the servo signals.

Since servo signals are recorded at predetermined intervals in a track, the servo signals are periodically read by the head as long as a spindle motor rotates the disk at a constant speed.

In real world use, intervals at which the servo signals are read vary slightly even under optimal spindle speed and stability. However, HDDs are typically designed to perform normal read/write operations when the variation of intervals at which the servo signals are read, that is, the amount of jitter, is less than 0.1%.

The amount of jitter in the servo signals represents the variation of intervals at which the servo signals are read, and is given as a percentage of intervals at which the servo signals are detected versus intervals at which normal servo signals are detected.

The movement of the HDD affects the amount of jitter in the servo signals in the following cases.

First, when the rotation of the spindle motor is disturbed by the movement of the HDD, the amount of jitter varies. In detail, a force applied to the HDD affects the rotational force of the spindle motor, and accordingly, the rotation of the spindle motor is disturbed.

Second, when the movement of the head is disturbed by the movement of the HDD, the amount of jitter varies. In detail, the force applied to the HDD affects the head in following the tracks.

Third, when the balance of the disk is disturbed by the movement of the HDD, the amount of jitter varies. In detail, the force applied to the HDD disturbs the balance of the disk, and accordingly, the disturbance affects the detection of the servo signals recorded on the disk.

The amount of jitter is most greatly affected when the rotation of the spindle motor is disturbed. Specifically, the force applied to the HDD disturbs the spindle motor such that the spindle motor cannot move at a constant speed. As a result, the disk rotates faster or slower. Since intervals at which the servo signals recorded on the disk are read varies according to the faster or slower rotation of the disk, the amount of jitter in the servo signals increases.

The degree to which the rotation of the spindle motor is disturbed corresponds to the degree of the movement of the HDD. Accordingly, whether the movement great enough to apply substantial shocks to the HDD occurs can be predicted using the amount of jitter in the servo signals, which represents the degree to which the rotation of the spindle motor is disturbed.

Figure 5:
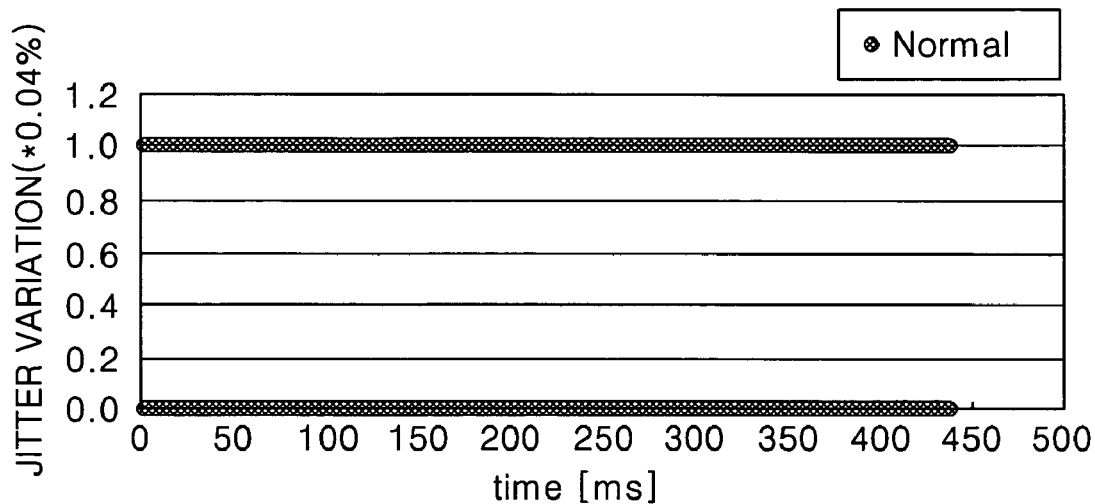
FIG. 5 is a graph illustrating jitter measured when the HDD is fixed.

FIG. 5 is a graph illustrating jitter measured when the HDD is fixed. In the graph of FIG. 5, a horizontal axis denotes time, and a vertical axis denotes the amount of jitter. Referring to FIG. 5, the amount of jitter is constant over time, and is very low; less than 0.04%.

Figure 6:
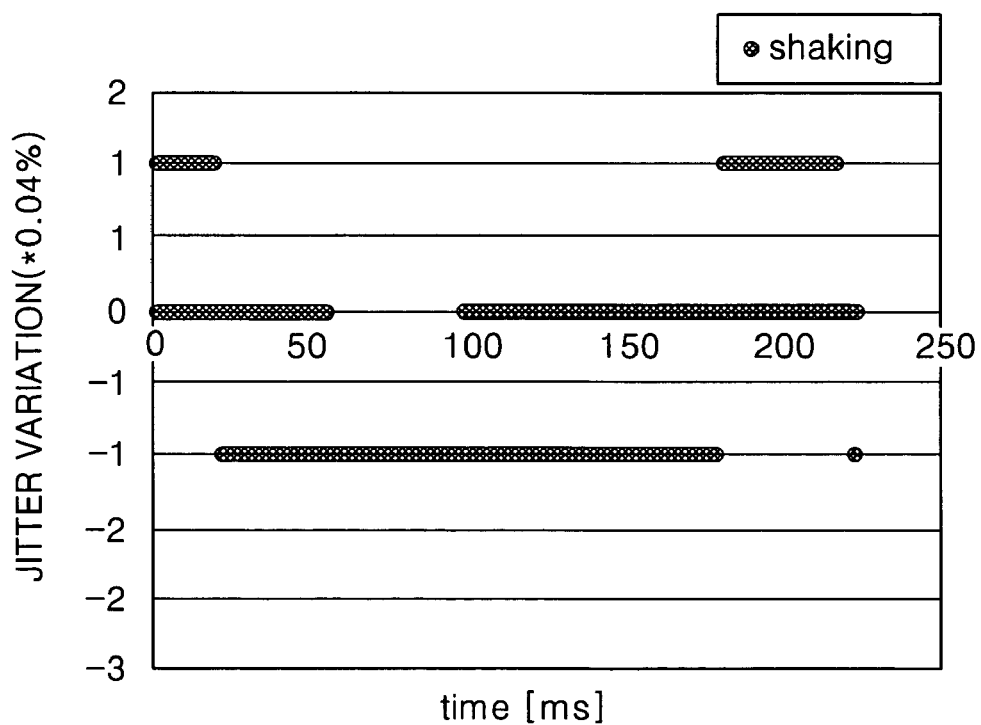
FIG. 6 is a graph illustrating jitter measured when the HDD is shaken.

FIG. 6 is a graph illustrating jitter measured when the HDD is shaken. Referring to FIG. 6, the amount of jitter is approximately ±0.8% greater than the amount of jitter shown in FIG. 5.

Figure 7:
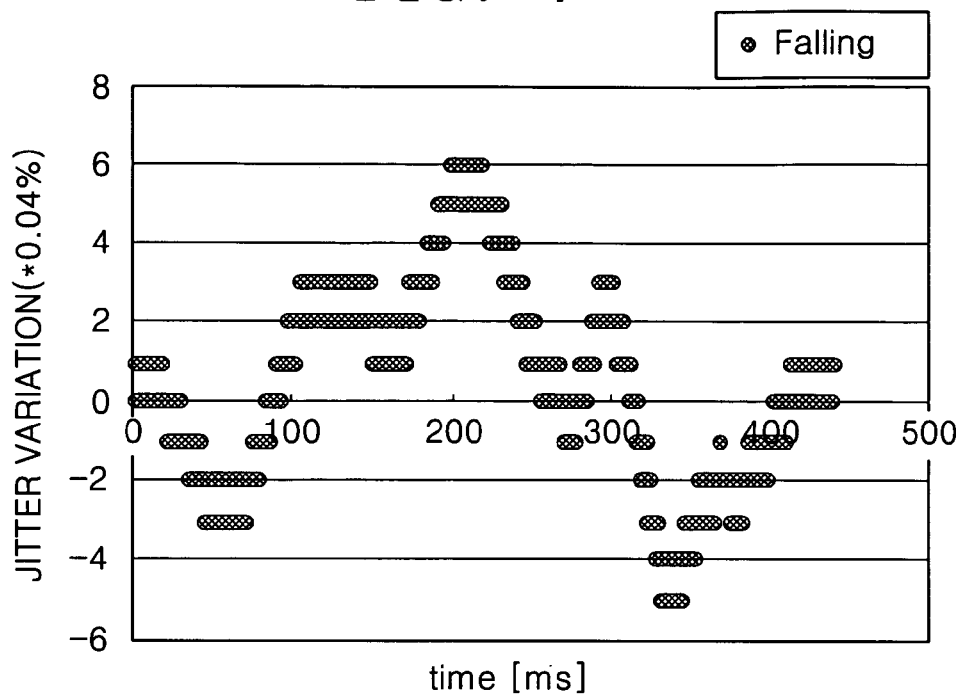
FIG. 7 is a graph illustrating jitter measured when the HDD is fallen.

FIG. 7 is a graph illustrating jitter measured when the HDD is falling. Referring to FIG. 7, the amount of jitter is approximately ±2.4% greater than the amount of jitter shown in FIG. 5.

The present embodiment protects the head and the disk by measuring the movement of the HDD using the amount of jitter in the servo signals and unloading the head if the measured amount of jitter is greater than a threshold amount of jitter great enough to damage the head.

Figure 8:
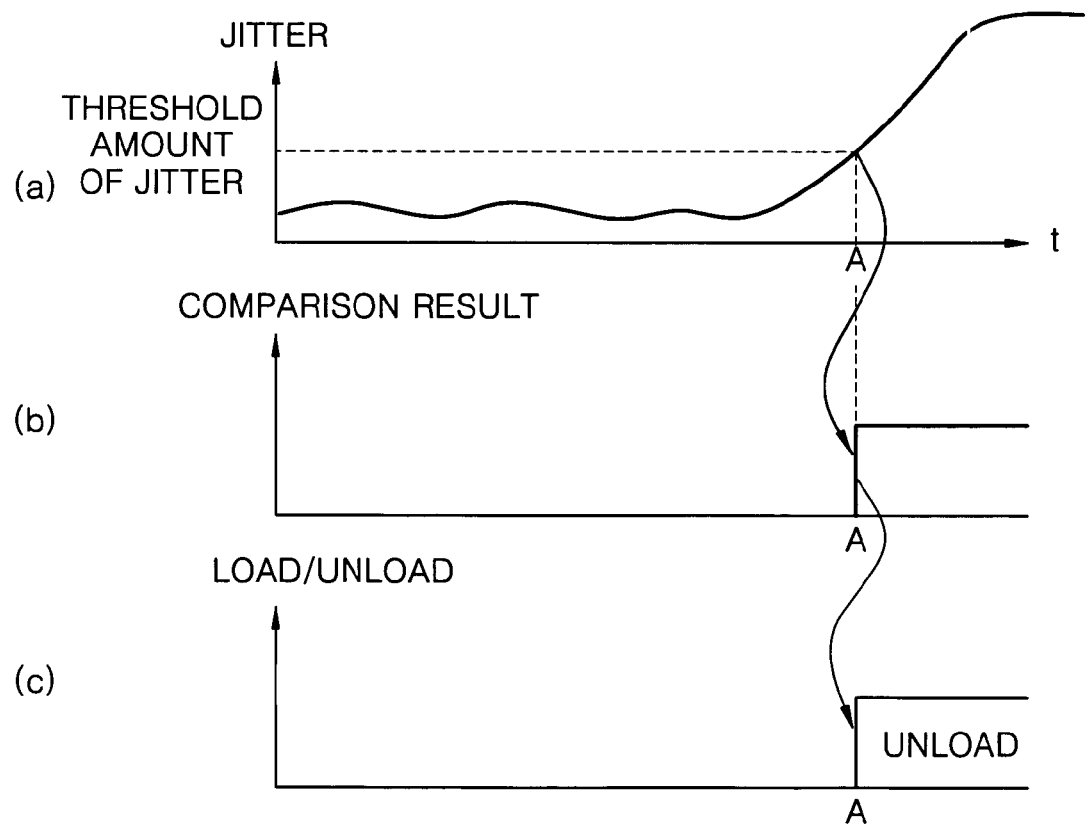
FIG. 8, parts (a)-(c), are graphs for explaining a method of protecting a HDD from shocks according to the present invention.

FIG. 8A through FIG. 8C are graphs for explaining a method of protecting a HDD from shocks according to the present invention. FIG. 8A illustrates variations in the amount of jitter in servo signals over time, wherein the amount of jitter in the servo signals exceeds a threshold amount of jitter at a point A.

The point A is detected by comparing the detected amount of jitter with the threshold amount of jitter as shown in FIG. 8B.

If the amount of jitter detected at the point A is greater than the threshold amount of jitter as shown in FIG. 8B, the head is unloaded and positioned on a ramp as shown in FIG. 8C.

When the head in the HDD is placed over a rotating disk, an air bearing is generated between a slider and the disk due to an air pressure of the rotating disk. The slider flies over the disk due to the air bearing.

In the meantime, a vertical movement of the head at the center of the slider can be defined by the following equation:

$$m\left(\frac{d^2}{dt^2}z\right) - \int\int (P - P_a)dxdy = -Fsz.$$

Where z represents a vertical movement at the center of the slider, P represents a pressure calculated by Reynolds Equation, Pa represents an ambient pressure, and m represents the mass of the slider. If external shocks greater than a designed stiffness Fsz of the air bearing are applied to the HDD, the air bearing is deformed and the head and the disk come into physical contact with each other.

The air bearing between the slider and the disk in the HDD is designed to tolerate shocks of 200 to 300 G so that the head and the disk can be prevented from contacting each other. However, if the head is unloaded, since the slider is positioned outside the disk, the head and the disk can be protected from shocks greater than 1000 G.

Accordingly, when external shocks are applied, the shock resistance of the HDD when the head is unloaded from the disk is much greater than that when the head is loaded on the disk.

The present embodiment protects the head and the disk by unloading the head when the amount of jitter is great enough to damage the head, that is, when a movement great enough to damage the head and the disk is predicted.

FIG. 9 is a flowchart of a method of protecting a head of a HDD according to an embodiment of the present invention.

First, in operation S902, a tracking servo operation is performed.

In operation S904, servo signals are read using a head that follows tracks to detect the amount of jitter in the servo signals.

The amount of jitter in the servo signals is given as a percentage of intervals at which the servo signals are actually detected versus intervals at which normal servo signals are detected. Servo signals are recorded at regular intervals on a track of a disk in the HDD. However, if the rotation of a spindle motor is disturbed, intervals at which the servo signals are detected are changed.

In operation S906, the detected amount of jitter is compared with a predetermined threshold amount of jitter corresponding to a movement great enough to damage the head and the disk.

In operation S908, if the detected amount of jitter is greater than the predetermined threshold amount of jitter, the head is unloaded to protect the head and the disk.

FIG. 10 is a block diagram of a HDD according to an embodiment of the present invention.

Figure 2:
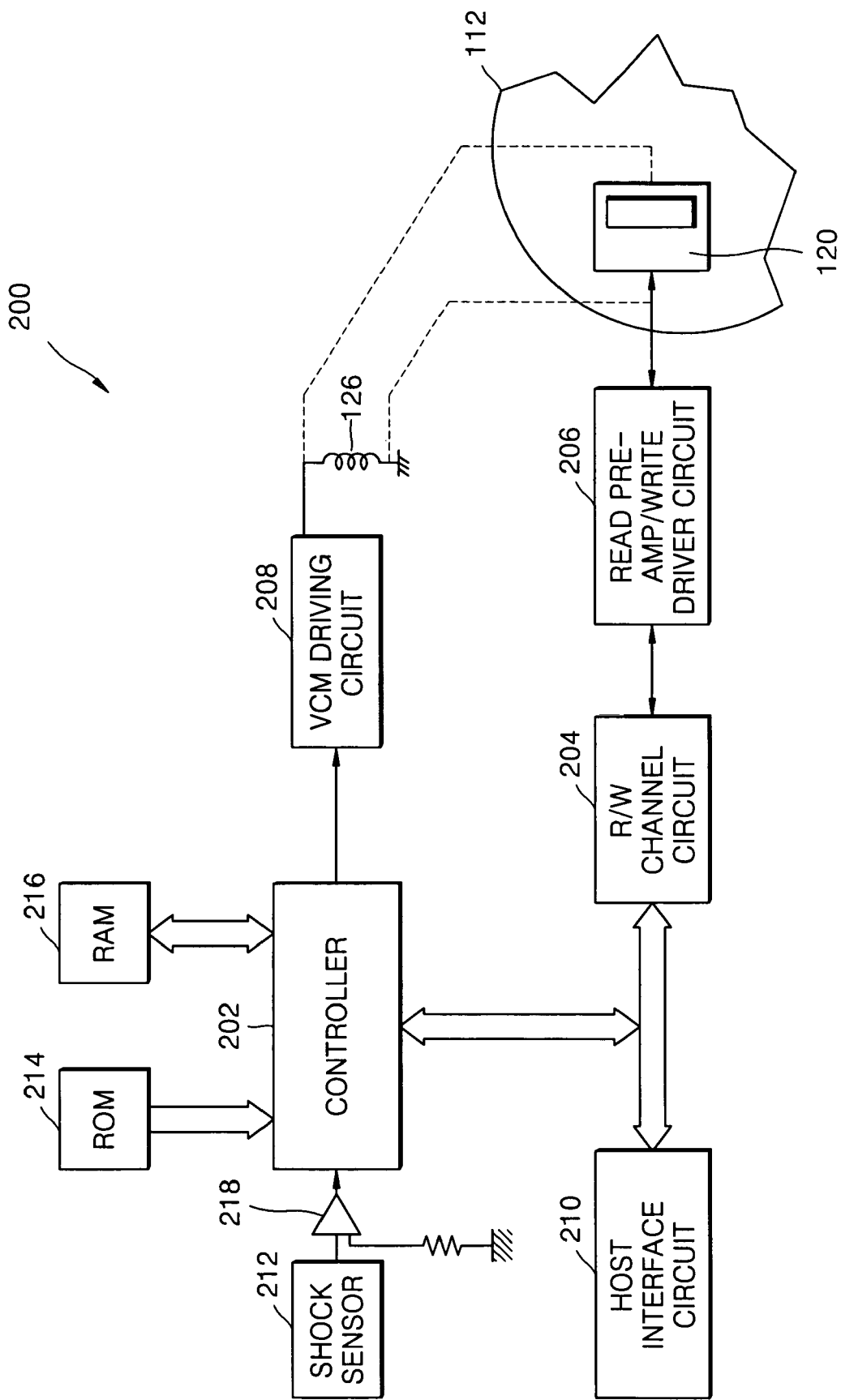
FIG. 2 is a bock diagram of a control system for controlling the HDD shown in FIG. 1.
Figure 3:
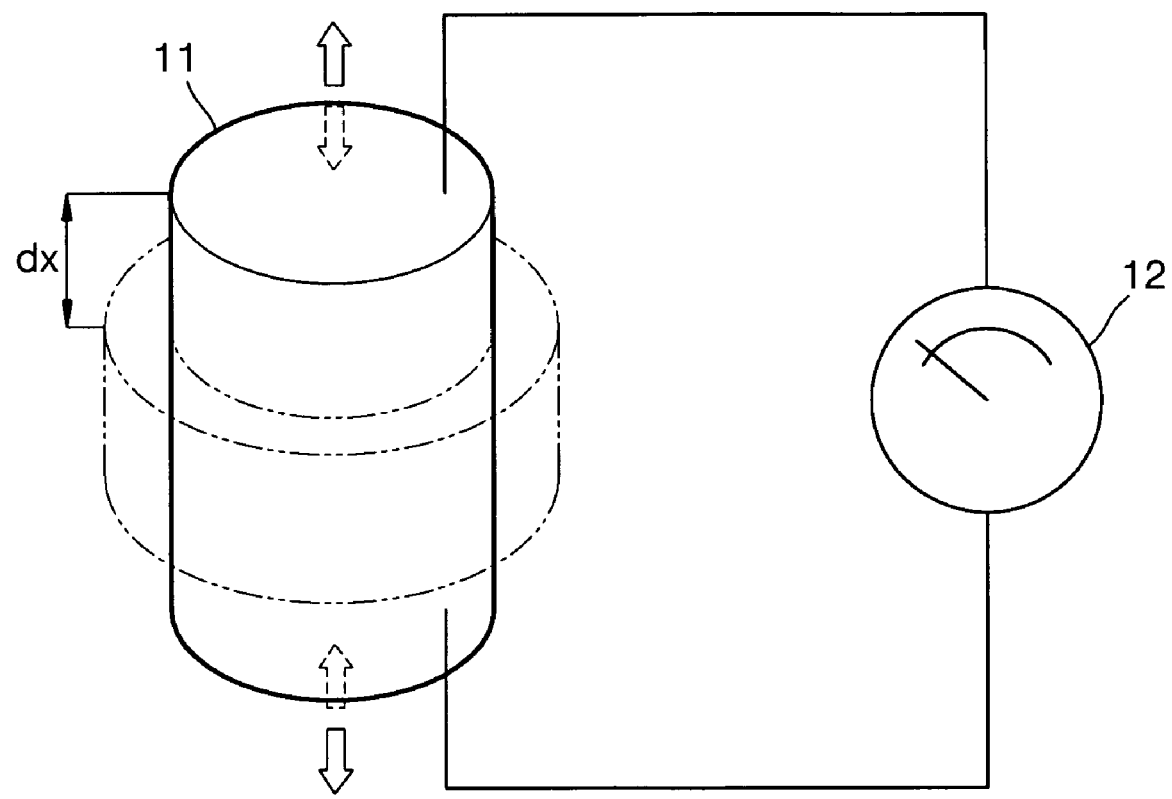
FIG. 3 is a diagram of a shock sensor shown in FIG. 2.

The same elements in FIG. 10 as those shown in FIG. 2 are given the same reference numerals, and a detailed explanation thereof will be omitted.

Referring to FIG. 10, a HDD 1000 includes a jitter detector 1004 inputting a servo detecting signal and measuring the amount of jitter, a comparator 1006 comparing the amount of jitter detected by the jitter detector 1004 with a predetermined threshold amount of jitter, and a controller 1002 generating a command to unload a head according to the comparison result of the comparator 1006.

The jitter detector 1004 calculates the amount of jitter by detecting time intervals T1 and T2 of the servo detecting signal and comparing the time intervals T1 and T2 with a time interval T of a normal servo detecting signal. The servo detecting signal indicates whether servo signals are detected, and is usually generated in response to a servo address mark (SAM).

The comparator 1006 compares the amount of jitter measured by the jitter detector 1004 with the predetermined threshold amount of jitter. Here, the threshold amount of jitter has a value corresponding to a movement great to damage the head and a disk.

The controller 1002 unloads the head according to the comparison result of the comparator 1006. Specifically, if it is determined by the comparator 1006 that the amount of jitter is greater than the threshold amount of jitter, the head is unloaded in response to the determination.

Although the present embodiment has been explained in conjunction with an HDD, it is to be understood that the described embodiment may also be applied to other disk drives such as, for example, an optical disk drive or a magneto-optical disk drive.

The described embodiment of the present invention may be executed as method, apparatus, and system. When the present invention is executed as software, the elements of the present invention are code segments that perform necessary operations. Programs or code segments can be stored in processor-readable media, or may be transmitted over transmission media or network by computer data signals embodied in carrier waves. The processor-readable media include any media capable of storing or transmitting information. For example, the processor-readable media include electronic circuits, semiconductor memory devices, read-only memories (ROMs), flesh memories, erasable ROMs (EROMs), floppy disks, optical disks, hard disks, optical fiber media, radio frequency (RF) networks, and the like. The computer data signals include any signals capable of being transmitted over transmission media, such as electronic network channels, optical fiber, air, electronic systems, RF networks, and the like.

As described above, since the method of the described embodiment of protecting the head and the disk from shocks detects the movement of the HDD using the amount of jitter in the servo signals and unloads the head if the detected amount of jitter is greater than the threshold amount of jitter corresponding to the movement great enough to damage the head and the disk, the method can improve the shock resistance of the HDD.

Since the method of the described embodiment can detect the movement of the HDD using the servo signals recorded on the disk, the method can detect the movement of the HDD without an additional shock sensor.

Since the method of the described embodiment predicts the existence of the movement great enough to damage the HDD using the amount of jitter in the servo signals to protect the head and the disk, the method can improve the shock resistance of the HDD.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of protecting a hard disk drive from shocks, comprising:
   reading servo signals from a rotating disk using a head that follows tracks on the disk;
   detecting an amount of jitter in the servo signals; and
   determining whether the hard disk drive is fixed, being shaken or falling based on the detected amount of jitter, comprising:
      comparing the detected amount of jitter with a predetermined threshold corresponding to a movement great enough to damage the head and the disk, and
      unloading the head when the detected amount of jitter is greater than the predetermined threshold.

2. The method of claim 1, wherein the determining comprises:
   determining that the hard disk drive is fixed if the amount of jitter is less than approximately 0.04%,
   determining that the hard disk drive is being shaken if the amount of jitter is approximately ±0.8% greater than the amount of jitter when the HDD is fixed, and
   determining that the hard disk drive is falling if the amount of jitter is approximately ±2.4% greater than the amount of jitter when the HDD is fixed.

3. The method of claim 1, wherein the amount of jitter is measured as a percentage of intervals at which the servo signal are actually detected versus intervals at which normal servo signal are to be detected.

4. A hard disk drive comprising:
   a head following tracks on a rotating disk and reading servo signals based on the rotating disk;
   a jitter detector comparing intervals at which servo signals read by the head with intervals at which normal servo signals are read, and detecting an amount of jitter in the servo signals based on the comparison, the jitter detector determining whether the hard disk drive is fixed, being shaken or falling based on the detected amount of jitter;
   a comparator comparing the amount of detected jitter with a predetermined threshold corresponding to a movement great enough to damage the head and the disk if the jitter detector determines that the hard disk drive is being shaken or falling; and
   a controller controlling the head to be unloaded according to a comparison result of the comparator.

5. A method of improving a shock resistance of a hard disk drive, comprising:
   reading servo signals from a rotating disk;
   detecting an amount of jitter in the servo signal; and
   determining whether the hard disk drive is fixed, being shaken or falling based on the detected amount of jitter and, comprising:
      comparing the detected amount of jitter with a predetermined threshold, and
      unloading the head if the detected amount of jitter is greater than the predetermined threshold.

6. The method of claim 5, wherein the reading is performed by a head that follows tracks on the disk.

7. The method of claim 6, wherein the predetermined threshold corresponds to a movement of the head great enough to damage the head and/or the disk.

8. The method of claim 7, wherein the movement is a vertical movement of the head in relation to the disk.

9. The method of claim 8, wherein the vertical movement is defined by the following equation:

$$m\left(\frac{d^2}{dt^2}z\right) - \int\int(P - P_a)dxdy = -Fsz,$$

wherein z represents a vertical movement at the center of a slider at which the head is disposed, P represents a pressure calculated by Reynolds Equation, Pa represents an ambient pressure, m represents the mass of the slider, and Fsz is a designed stiffness of an air bearing.

10. The method of claim 5, wherein the amount of jitter is determined as a percentage of intervals at which the servo signal are actually detected versus predetermined intervals at which normal servo signal are to be detected.

11. The method of claim 10, wherein intervals at which the servo signal is detected is changed when rotation of a spindle motor is disturbed.

12. The method of claim 5, further comprising performing a track servo operation to unload a read/write head and move the read/write head to track so as to track at least one track of the disk.

13. A method of protecting a hard disk drive without a shock sensor from shocks, comprising:
   reading servo signals from a rotating disk using a head that follows tracks on the disk;
   detecting an amount of jitter in the servo signals; and
   determining whether the hard disk drive is fixed, being shaken or falling based on the detected amount of jitter and, comprising:
      comparing the detected amount of jitter with a predetermined threshold corresponding to a movement great enough to damage the head and the disk, and
      unloading the head when the detected amount of jitter is greater than the predetermined threshold.

14. A shock resisting section of a hard disk drive, comprising:
   a jitter detector comparing intervals at which servo signals read by a head following tracks of a disk with intervals at which normal servo signals are read, and detecting an amount of jitter in the servo signals based on the comparison, the jitter detector determining whether the hard disk drive is fixed, being shaken or falling based on the detected amount of jitter;
   a comparator comparing the amount of detected jitter with a predetermined threshold if the jitter detector determines that the hard disk drive is being shaken or falling; and
   a controller unloaded a loaded head according to a comparison result of the comparator.

15. The shock resisting section of claim 14, wherein the predetermined threshold corresponds to a movement great enough to damage the head and/or the disk.

* * * * *